(12) United States Patent
Yang et al.

(10) Patent No.: US 11,608,205 B2
(45) Date of Patent: Mar. 21, 2023

(54) HEAD OF A TAG DEVICE

(71) Applicant: Powertech Technology Inc., Hukou Township, Hsinchu County (TW)

(72) Inventors: Ching-Chia Yang, Hukou Township, Hsinchu County (TW); Shin-Kung Chen, Hukou Township, Hsinchu County (TW); Yuan-Jung Lu, Hukou Township, Hsinchu County (TW); Yen-Yu Chen, Hukou Township, Hsinchu County (TW); Hsing-Fu Peng, Hukou Township, Hsinchu County (TW); Pao-Chen Lin, Hukou Township, Hsinchu County (TW)

(73) Assignee: Powertech Technology Inc., Hukou Township (TW)

( * ) Notice: Subject to any disclaimer, the term of this patent is extended or adjusted under 35 U.S.C. 154(b) by 257 days.

(21) Appl. No.: 17/071,384

(22) Filed: Oct. 15, 2020

(65) Prior Publication Data
US 2022/0002020 A1    Jan. 6, 2022

(30) Foreign Application Priority Data

Jul. 3, 2020   (TW) .................................. 109122630

(51) Int. Cl.
*B65C 9/28* (2006.01)
*B65C 7/00* (2006.01)
*B32B 11/00* (2006.01)

(52) U.S. Cl.
CPC .................. *B65C 9/28* (2013.01); *B65C 7/00* (2013.01); *B32B 11/00* (2013.01)

(58) Field of Classification Search
CPC .. B65C 7/00; B65C 9/28; B25B 11/00; B25B 11/005
(Continued)

(56) References Cited

U.S. PATENT DOCUMENTS

| 4,392,913 | A | 7/1983 | Baumli | |
|---|---|---|---|---|
| 6,640,865 | B1* | 11/2003 | Morikawa | B65C 1/021 |
| | | | | 156/542 |
| 2022/0002020 | A1* | 1/2022 | Yang | B65C 7/00 |

FOREIGN PATENT DOCUMENTS

| CN | 204606406 U | 9/2015 |
|---|---|---|
| CN | 106743184 A | 5/2017 |

(Continued)

OTHER PUBLICATIONS

English translation of CN209939186.*
(Continued)

*Primary Examiner* — Sonya M Sengupta
(74) *Attorney, Agent, or Firm* — Patenttm.us

(57) ABSTRACT

A head of a tag device having a body, at least one row of negative-pressure through holes and at least one row of positive-pressure through holes. The body has a first surface and a second surface. The rows of negative and positive-pressure through holes are formed through the first and second surfaces of the body and arranged along a long-axis direction. Two negative and positive-pressure through holes at both ends of the corresponding row of negative and positive-pressure through holes are respectively close to the short sides of the body. Therefore, an effective labeling area is distributed between two short sides. The head of the tag device of the present invention provides a stable labeling operation for different products where different components are mounted and increases units per hour (UPH).

8 Claims, 8 Drawing Sheets

(58) Field of Classification Search
USPC .......................................................... 269/21
See application file for complete search history.

(56) References Cited

FOREIGN PATENT DOCUMENTS

| | | | | |
|---|---|---|---|---|
| CN | 106892173 | A | | 6/2017 |
| CN | 107804545 | A | | 3/2018 |
| CN | 209939186 | U | | 1/2020 |
| CN | 110834781 | A | | 2/2020 |
| CN | 210556098 | U | | 5/2020 |
| CN | 111283583 | A | * | 6/2020 |
| TW | M330553 | U | | 4/2008 |

OTHER PUBLICATIONS

English translation of CN210556098.*
EIC search (Year: 2022).*
English translation of CN111348283.*
English translation of JP2010195403.*
English translation of CN108466191.*

* cited by examiner

HEAD OF A TAG DEVICE

BACKGROUND OF THE INVENTION

1. Field of the Invention

The present invention is related to a tag device, and more particularly to a head of a tag device.

2. Description of the Prior Arts

After different products are manufactured, different tags are required to paste on corresponding products respectively. Since the different products have different components mounted thereon, different heads of a tag device are required to attach a label to corresponding product successfully.

With reference to FIG. 7A, a head 80 of the tag device is illustrated. The head 80 has a plurality of vacuum holes 81 and the vacuum holes 81 are formed on a middle area of an attaching surface 801 of the head 80. The head 80 is moved to a top of a product and the vacuum holes 81 thereon are placed on a top of at least one component on a middle area of the product. A label is successfully attached to the at least one component. With further reference to FIG. 7B, another head 80' of the tag device is illustrated for another product. The vacuum holes 81 of the head 80' are formed on a side area of the attaching surface 801 of the head 80' according to at least one component on a side area of the product. Another label is successfully attached to the at least one component, too.

Furthermore, if another product has a plurality of components mounted thereon, a specific head of the tag device is required according to different positions of the components. Therefore, more different products need more different heads and time and cost of attaching labels are increased accordingly.

With reference to FIG. 7B, the vacuum holes 81 are also used to provide a positive-pressure airflow to blow the label mounted the at least one component tightly. If the components on the product have different positions and/or different heights, it is hard to control the vacuum pressure or positive-pressure of the vacuum holes 81 and the stability of attaching labels is not good enough. Therefore, the bad stability causes that a failure rate of the tag device is increased, a rework rate is increased and productivity (unit per hour; UPH) is decreased.

To overcome the shortcomings of the tag device, the present invention provides a head of the tag device to mitigate or obviate the aforementioned problems.

SUMMARY OF THE INVENTION

An objective of the present invention is to provide a head of a tag device for different products with different components thereon.

To achieve the objective as mentioned above, the head of the tag device has a body, at least one row of negative-pressure through holes and at least one row of positive-pressure through holes. The body has a first surface, a second surface, two long sides and two short sides. The at least one row of negative-pressure through holes is formed through the first surface and the second surface and arranged according to a long-axis direction of the body. The two negative-pressure through holes at both ends of the row of negative-pressure through holes are respectively close to the short side of the body. The at least one row of positive-pressure through holes is formed through the first surface and the second surface and arranged according to a long-axis direction of the body. The two positive-pressure through holes at both ends of the row of positive-pressure through holes are respectively close to the short side of the body.

Based on the foregoing description, the negative-pressure through holes and the positive-pressure through holes are distributed between the two short sides of the body, so a suction area of the head is expanded to cover the entire second surface. Therefore, the label is sucked by the selected negative-pressure through holes on a specific position of the second surface of the head according to the position of the components to be attached. Furthermore, a positive-pressure airflow is provided by the selected positive-pressure through holes corresponding to the position of the components to be attached. The present invention does not require different customized heads of the tag device for different products, provides a good stability tag task and increases UPH.

Another objective of the present invention is to provide a controlling method of a tag device having a head and a platform. The head has at least one first connector securely inserted into a corresponding negative-pressure through hole and at least one second connector securely inserted into a corresponding positive-pressure through hole. The controlling method has steps of:

(a) placing a product on the platform, wherein a component of the product faces to the head and a length of the component is shorter than that of the head;

(b) inserting at least one negative-pressure air pipe into the corresponding first connector and inserting at least one positive-pressure air pipe into the corresponding second connector according to a position of the component on the product;

(c) moving the head to a position of a label and sucking the label on a second surface of the head by suction generated by the negative-pressure air pipe; and (d) moving the head on the position of the component and attaching the label on the component by a positive-pressure airflow generated by the positive-pressure air pipe.

Based on the foregoing description, in the controlling method the negative-pressure air tube and positive-pressure air tube are respectively inserted into the corresponding first and second connectors according to the positions of the component on the product. Then the label is successfully and tightly attached on the component. Therefore, the label suction area of the head is adjustable to align the component on the product. The present invention provides a good stability tag task for the components with different positions and increases UPH.

Other objectives, advantages and novel features of the invention will become more apparent from the following detailed description when taken in conjunction with the accompanying drawings.

DETAILED DESCRIPTION OF THE PREFERRED EMBODIMENTS

The present invention provides a head of a tag device for different products. With an embodiment and drawings thereof, the features of the present invention are described in detail as follow.

Figure 1A:
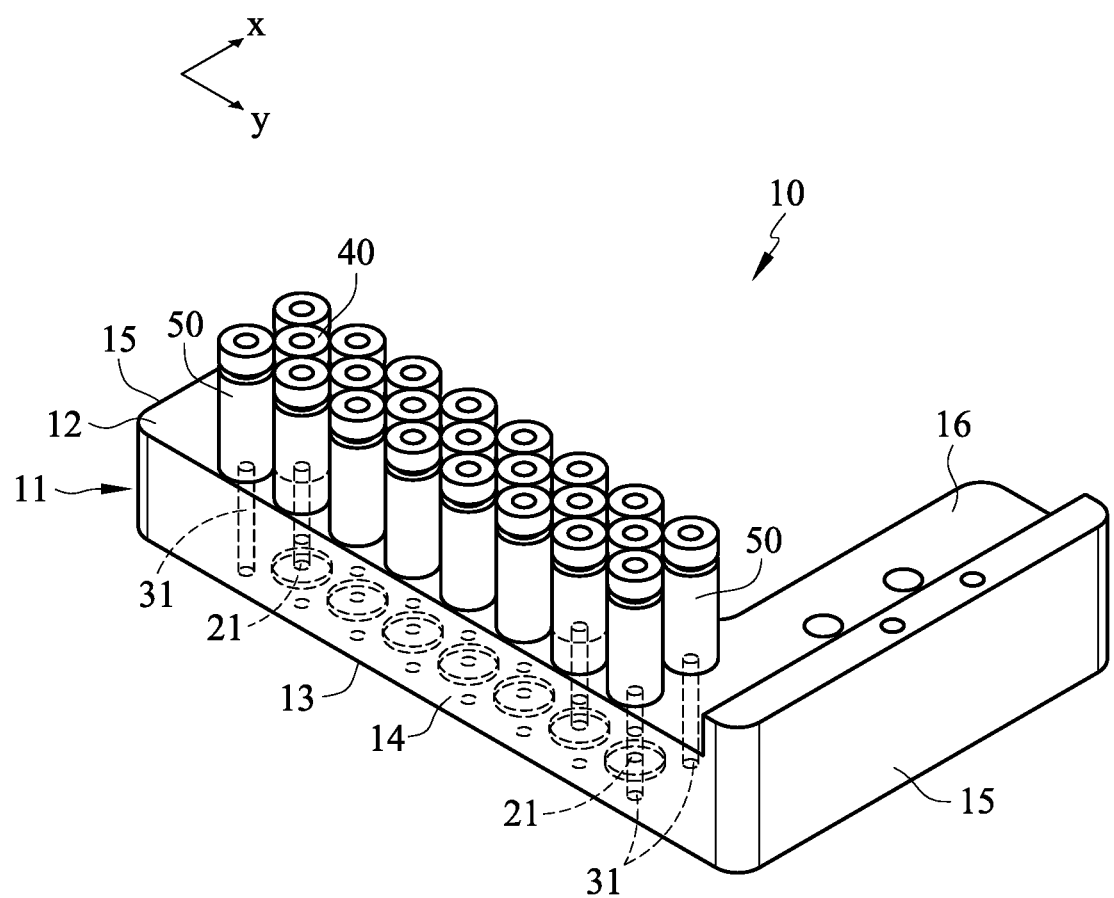
FIG. 1A is a perspective view of a head of a tag device.
Figure 1B:
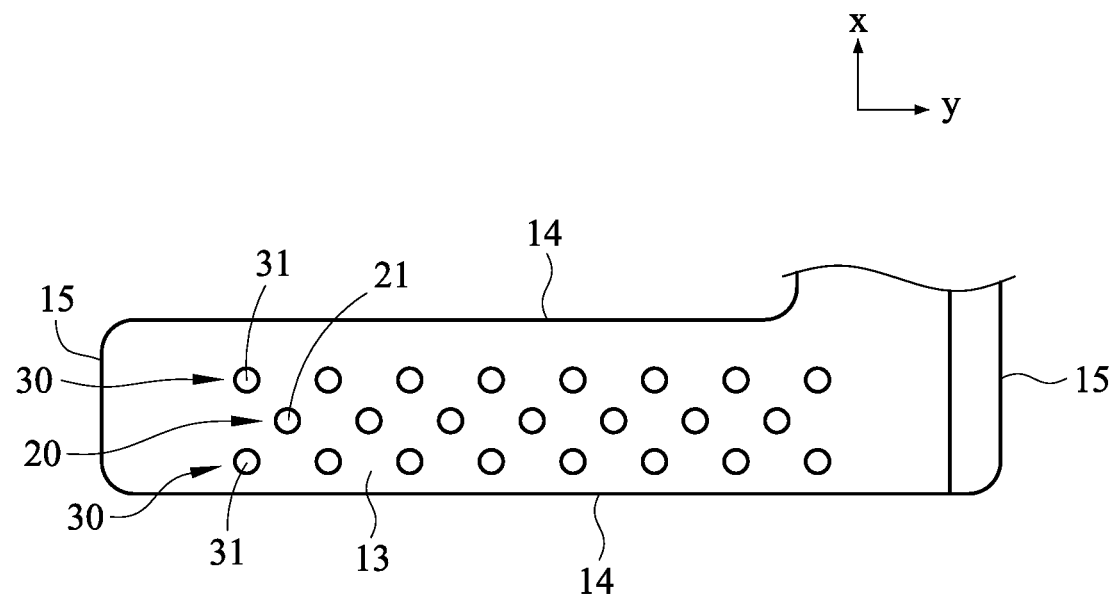
FIG. 1B is a bottom plan view of the head of the tag device.
Figure 2:
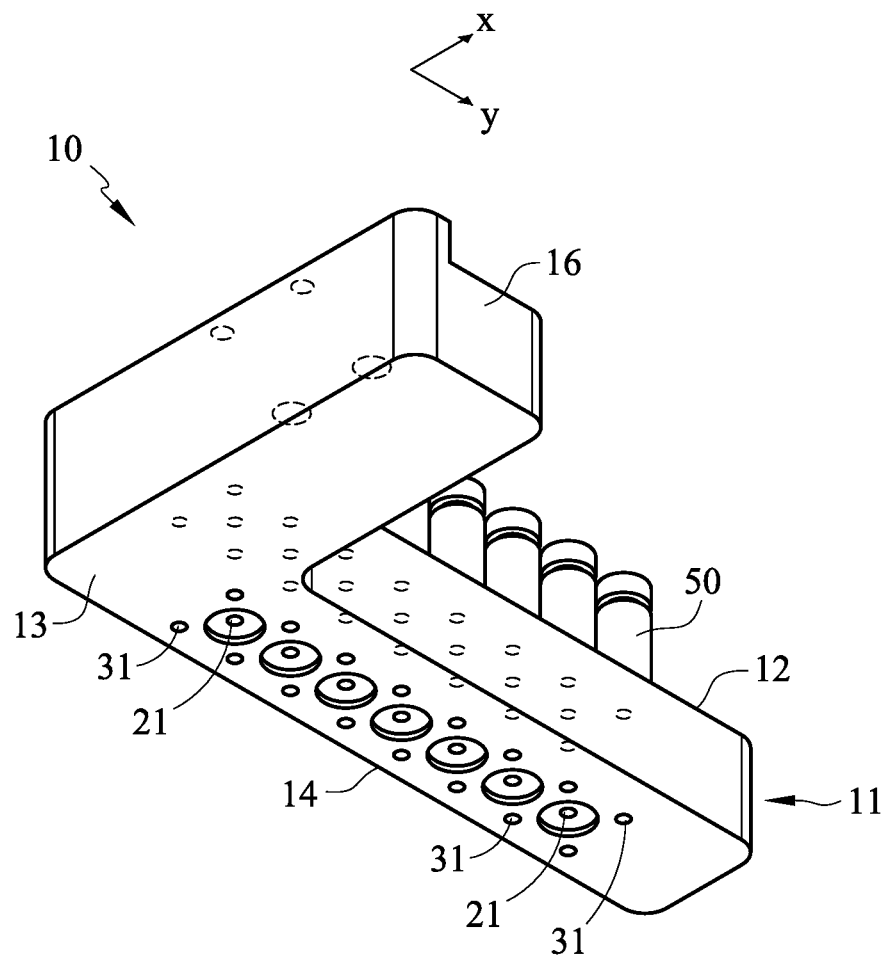
FIG. 2 is a bottom perspective view of the head of the tag device.

With reference to FIGS. 1A, 1B and 2, the head 10 of the tag device of the present invention has a body 11, at least one row of negative-pressure through holes 20 and at least one row of positive-pressure through holes 30.

The body 11 has a first surface 12, a second surface 13, two opposite long sides 14 and two opposite short sides 15. In one embodiment, the body 11 further has a connecting part 16 vertically extended from one of the short sides 15 and the connecting part 16 is used to connect the tag device (not shown).

The at least one row of negative-pressure through holes 20 has a plurality of negative-pressure through holes 21 formed through the first and second surfaces 11, 12 of the body 11 and arranged equidistantly according to a long-axis direction Y of the body 11. The two negative-pressure through holes at both ends of the row of negative-pressure through holes 20 are respectively close to the short sides 15 of the body. Therefore, the negative-pressure through holes 21 are evenly distributed on the body 11. In one embodiment, the body 11 of the head 10 has a single row of negative-pressure through holes 20 arranged in a middle position of the body 11 according to the long-axis direction Y, as shown in FIG. 2.

The row of positive-pressure through hole 30 has a plurality of positive-pressure through hole 31 formed through the first and second surfaces 12, 13 of the body 11 and arranged equidistantly according to a long-axis direction Y of the body 11. The two positive-pressure through holes at both ends of the row of positive-pressure through holes 30 are respectively close to the short sides 15 of the body. Therefore, the positive-pressure through holes 31 are evenly distributed on the body 11. In one embodiment, the body 11 of the head 10 has two rows of negative-pressure through holes 30 respectively arranged two sides of the row of negative-pressure through holes 20 and are respectively close to the long sides 14, as shown in FIG. 2. In one embodiment, an amount of the positive-pressure through holes 31 in each row of positive-pressure through holes 30 is larger than that of the negative-pressure through holes 21 in the row of negative-pressure through holes 20. The two positive-pressure through holes 31 at both ends of the at least one row of positive-pressure through holes 30 are respectively closer to the short sides 15 of the body 11 than the negative-pressure through holes 21 at both ends of the at least one row of negative-pressure through holes 20. Furthermore, the negative-pressure through holes 21 and the positive-pressure through holes 31 are arranged in a staggered manner.

Figure 4A:
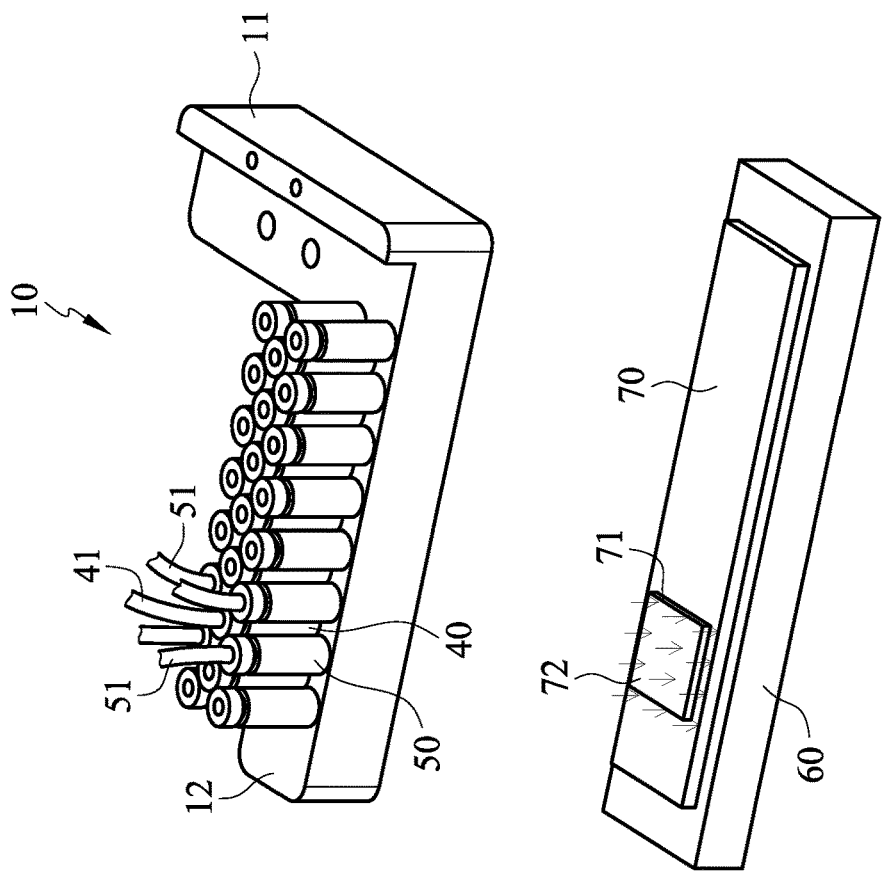
FIG. 4A is an operational schematic view of the head of the tag device providing a positive-pressure airflow to a label on a component.

With reference to FIGS. 1A and 4A, the body 11 of the head 10 further has a plurality of first connectors 40, a plurality of second connectors 50, at least one negative-pressure air pipe 41 and at least one positive-pressure air pipe 51. The first connectors 40 respectively align the negative-pressure through holes 21 and mounted on the first surface 12 to respectively communicate with the corresponding negative-pressure through holes 21. The negative-pressure air pipe 41 is inserted into the first connector 40, so a negative pressure suction is provided to the second surface 13 through the negative-pressure through holes 21. The second connectors 50 respectively align the positive-pressure through holes 31 and mounted on the first surface 12 to respectively communicate with the corresponding positive-pressure through holes 31. The positive-pressure air pipe 51 is inserted into the second connector 50, so a positive-pressure airflow is provided to the second surface 13 through the positive-pressure through holes 31.

A controlling method of the tag device having the head of the present invention is further described as follows. With reference to FIG. 3A, a product 70 is placed on a platform 60 of the tag device and the product 70 has one component 71 mounted thereon. The component 71 faces the head 10 and has a length short than that of the head 10. With further reference to FIGS. 1A and 4A, the negative-pressure air pipes 41 are inserted into the first connectors 40 on the negative-pressure through holes 21 corresponding to a position of the component 71. The positive-pressure air pipes 51 are also inserted into the second connectors 50 on the positive-pressure through holes 31 corresponding to the position of the component 71. The head 10 is moved to a position of a label 72 and the negative-pressure suction is provided on the second surface 13 by the negative pressure air pipe 41. With reference to FIG. 3A, the label 72 is sucked on the second surface 13 of the head 10 by the negative-pressure suction. The head 10 is moved to the position of the component 71 on the platform 60 and then the label 72 is attached to the component 71. With reference to FIGS. 1A and 4A, the positive-pressure airflow is provided to the second surface 13 of the head 10 by the positive-pressure air pipe 51 so the label 72 is attached to the component 71 by the positive-pressure airflow.

Figure 3B:
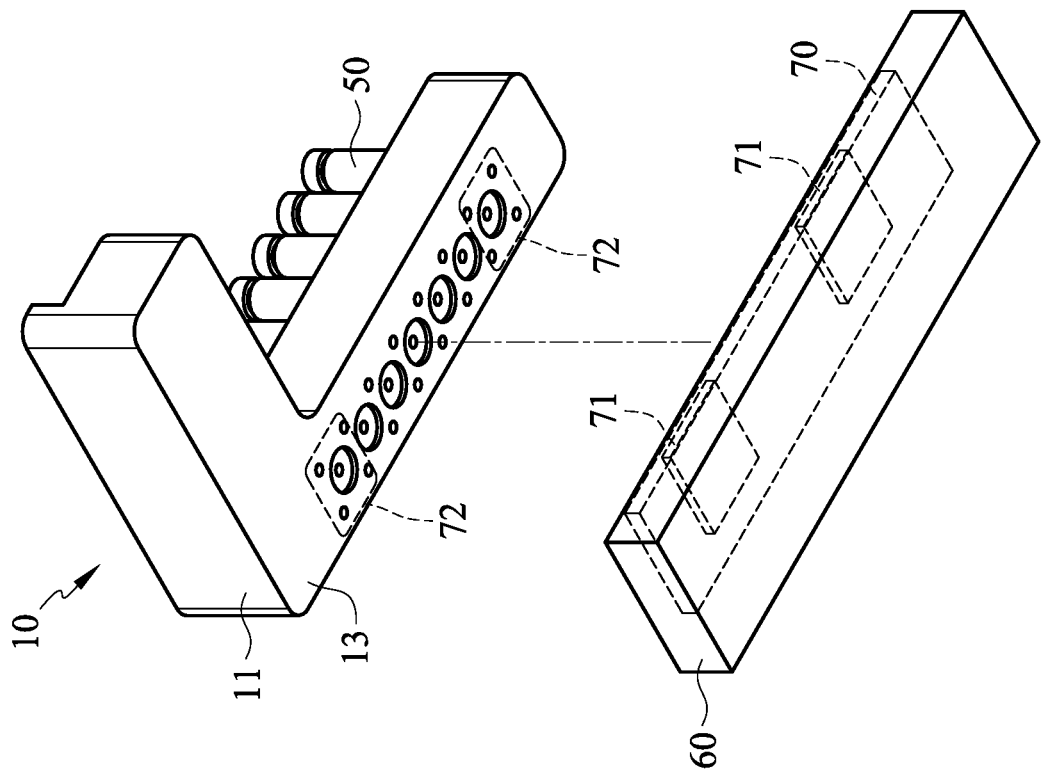
FIG. 3B is an operational schematic view of the head of the tag device sucking a label to align another component.
Figure 3A:
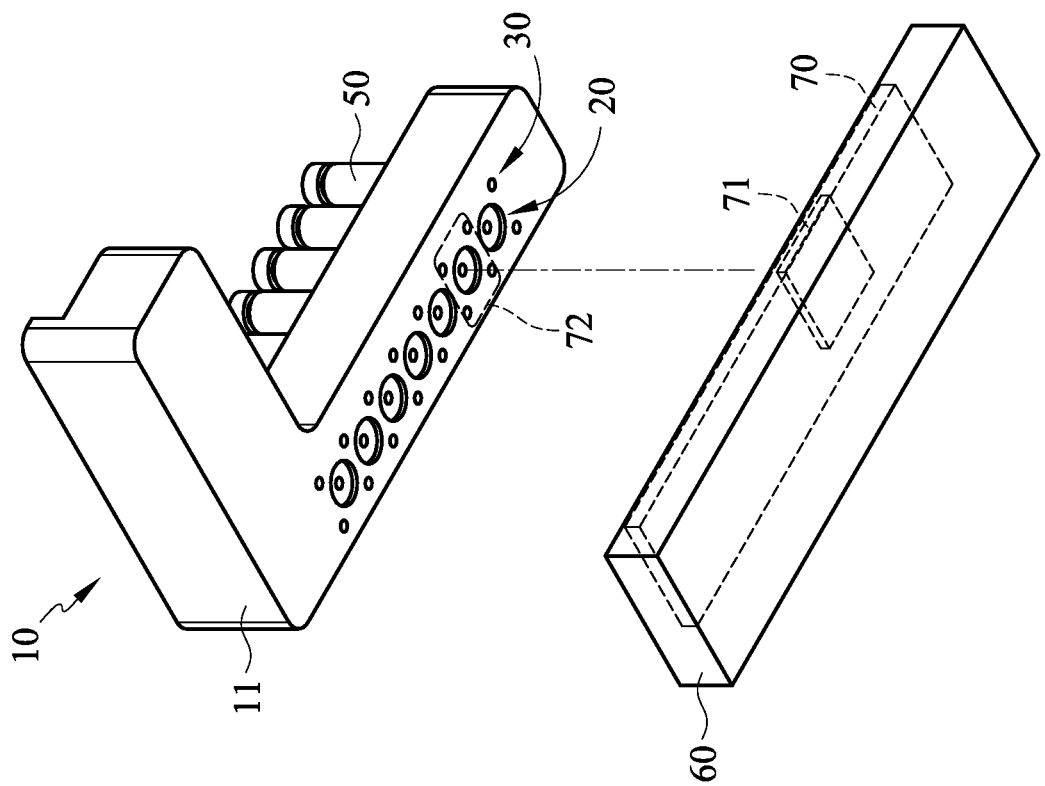
FIG. 3A is an operational schematic view of the head of the tag device sucking a label to align a component.
Figure 4B:
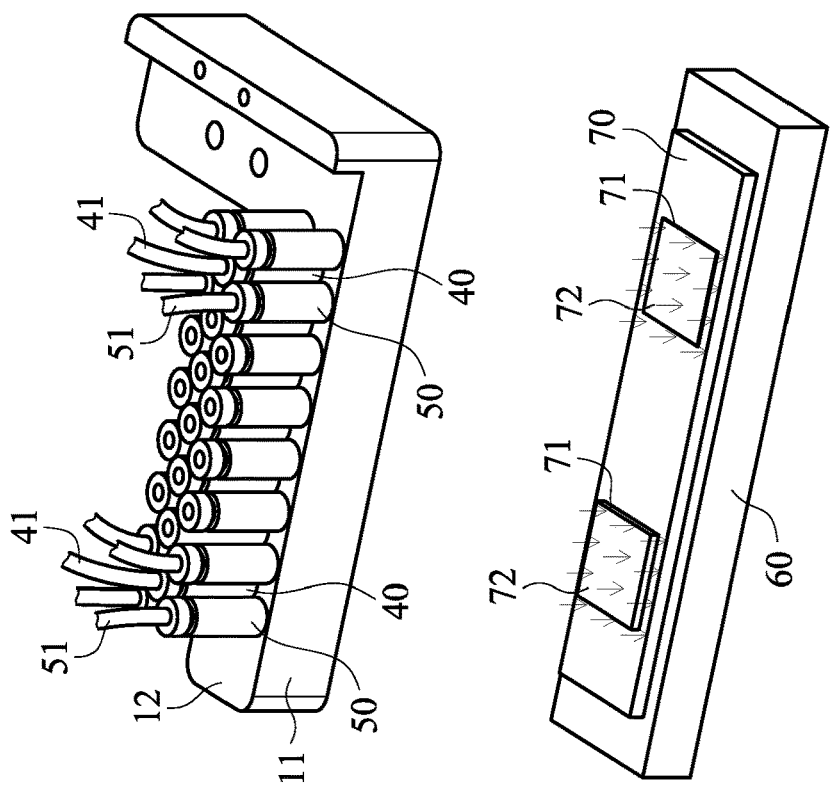
FIG. 4B is an operational schematic view of the head of the tag device providing a positive-pressure airflow to a label on another component.

With reference to FIGS. 1A, 3B and 4B, the head 10 is used for another product 70 having two components 71 to be attached. The product 70 is placed on the platform 60 and the components 71 face to the head 10. Each component 71 has a length shorter than that of head 10. With reference to FIGS. 1A and 4B, the negative-pressure air pipes 41 are inserted into the first connectors 40 on the negative-pressure through holes 21 corresponding to the different positions of the components 71. The positive-pressure air pipes 51 are also inserted into the second connectors 50 on the positive-pressure through holes 31 corresponding to the different positions of the components 71. The head 10 is moved to a position of a label 72 and the negative-pressure suctions are provided on the second surface 13 by the negative pressure air pipe 41. With reference to FIG. 3B, the labels 72 are sucked on the second surface 13 of the head 10 by the negative-pressure suctions. The head 10 is moved to the positions of the components 71 on the platform 60 and then the labels 72 are respectively attached to the corresponding components 71. With reference to FIGS. 1A and 4B, the positive-pressure airflows are provided to the second surface 13 of the head 10 by the positive-pressure air pipes 51, so the labels 72 are attached to the components 71 by the positive-pressure airflows. As shown in FIG. 4B, the positive-pressure airflows help the label tightly attached to the components 71 with different heights.

Figure 5:
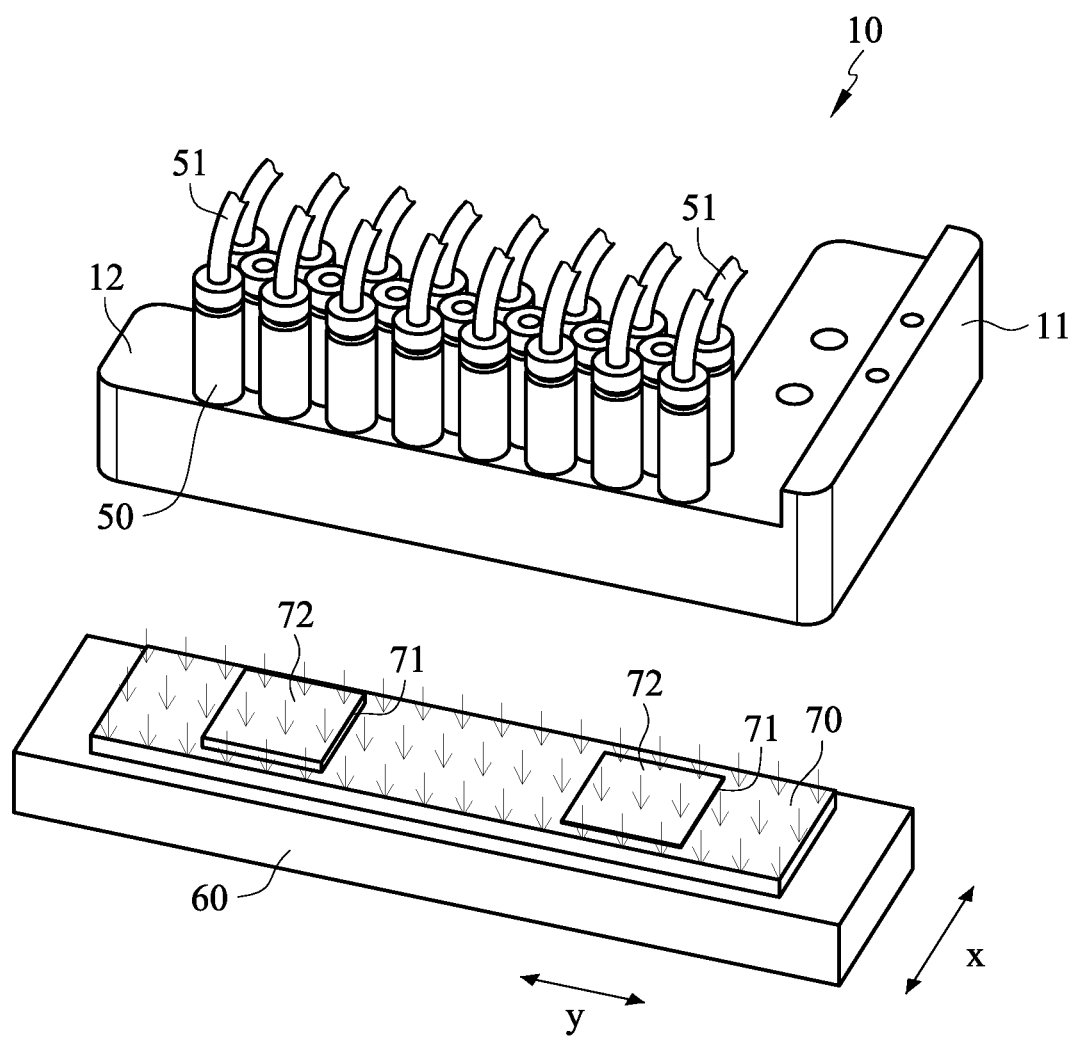
FIG. 5 is an operational schematic view of the head of the tag device providing a positive-pressure airflow to a label on a component.

To enhance the flatness of the label 72, as shown in FIG. 5, the positive-pressure air pipes 51 are respectively inserted into all of the second connectors 50 corresponding to the positive-pressure through holes 31, so the positive pressure airflow with a large area is provided on the entire second surface 13 to help the label 72 attached on the corresponding component evenly. Furthermore, the platform 60 of the tag device may be laterally moved along the long-axis direction Y or a short-axis direction X. When the positive pressure airflow is provided on the entire second surface 13, the platform is laterally moved backward or forward along the short-axis direction. Otherwise, as shown in FIG. 5, the carrier 60 is laterally moved backward or forward along the long-axis direction.

Figure 6:
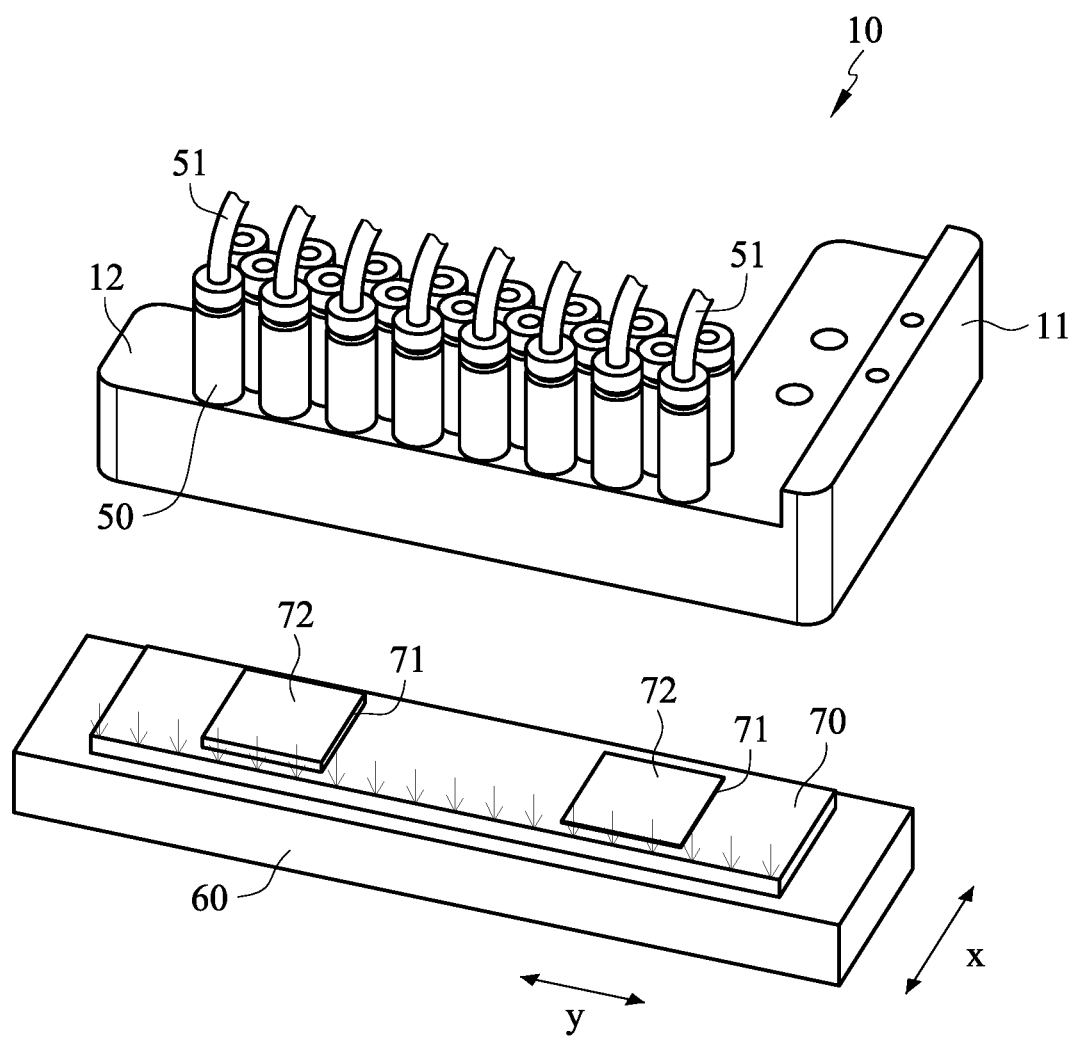
FIG. 6 is an operational schematic view of the head of the tag device providing a positive-pressure airflow to a label on another component.
Figure 7A:
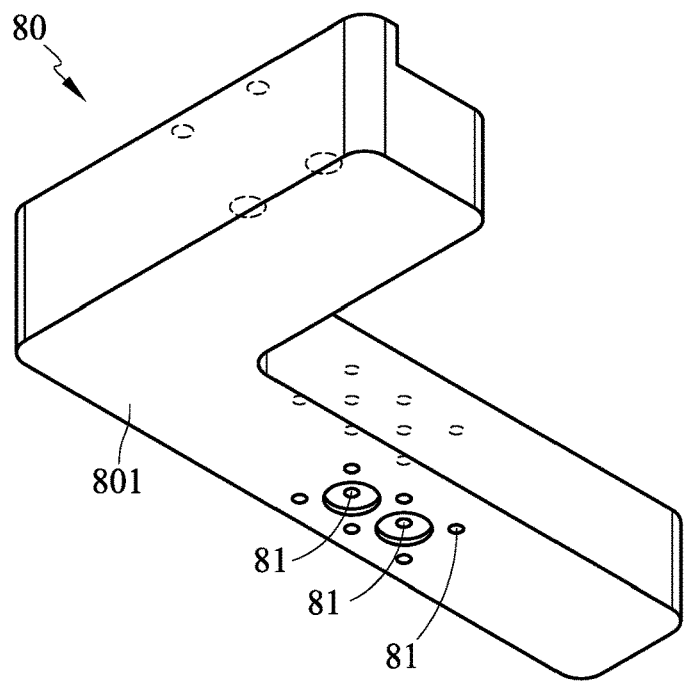
FIG. 7A is a bottom perspective view of a conventional head of a tag device.
Figure 7B:
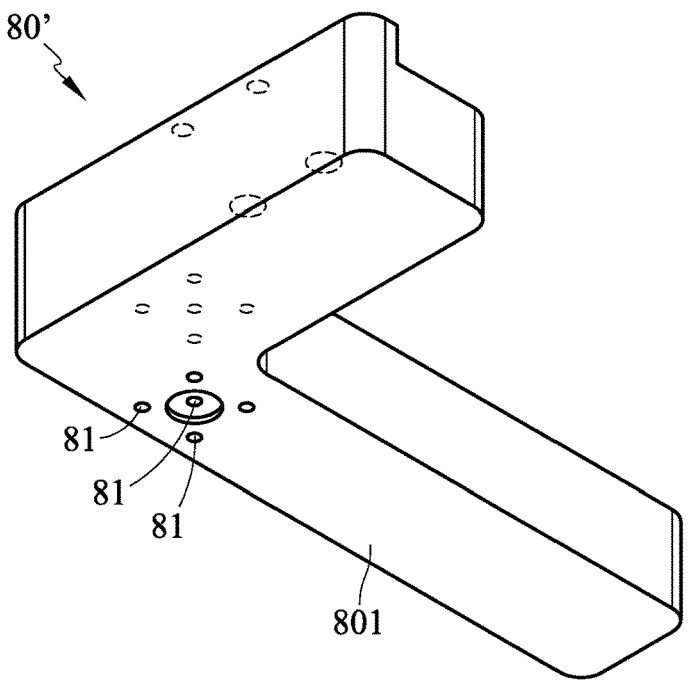
FIG. 7B is a bottom perspective view of another conventional head of a tag device.

As shown in FIG. 6, when the positive-pressure air pipes 51 are inserted into the second connectors 50 corresponding to all of the positive-pressure through holes 31 of one row of positive-pressure through holes 30, the positive-pressure airflow is used as an air knife and the platform is laterally moved along long-axis direction Y or a short-axis direction X. In addition, a pressure of the positive-pressure airflow may be adjustable.

Based on the foregoing description, the at least one row of negative-pressure through holes and at least one row of positive-pressure through holes are formed through the body of the head along the long-axis direction of the body. The negative-pressure through holes at both ends of the at least one row of negative-pressure through holes are respectively close to the short sides of the body. The two positive-pressure through holes at both ends of the at least one row of positive-pressure through holes are respectively close to the short sides of the body. Therefore, the suction area of the head is expanded between the two long sides and the two short sides of the body to cover the entire second surface. Furthermore, according to different positions of the components on a different product or different positions of the components on the product, the negative-pressure air pipes and the positive-pressure air pipes are respectively inserted into the first connectors corresponding to the negative-pressure through holes and the second connectors corresponding to the positive-pressure through holes. The suction area of the second surface of the head is changeable for different products. The present invention does not require different customized heads of the tag device for different products, provides a good stability tag task and increases UPH.

Even though numerous characteristics and advantages of the present invention have been set forth in the foregoing description, together with the details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A head of a tag device, comprising:
    a body having a first surface, a second surface, two opposite long sides and two opposite short sides;
    at least one row of negative-pressure through holes formed through the first surface to the second surface of the body and arranged along a long-axis direction of the body, wherein two negative-pressure through holes at both ends of the row of negative-pressure through holes are respectively close to the short sides; and
    at least one row of positive-pressure through holes formed through the first surface to the second surface of the body and arranged along a long-axis direction of the body, wherein two positive-pressure through holes at both ends of the row of positive-pressure through holes are respectively close to the short sides.

2. The head of the tag device as claimed in claim 1, wherein
    the at least one row of negative-pressure through holes are arranged equidistantly along the long-axis direction;
    the at least one row of positive-pressure through holes are arranged equidistantly along the long-axis direction;
    an amount of the positive-pressure through holes in each row of positive-pressure through holes is larger than that of the negative-pressure through holes in each row of negative-pressure through holes; and
    the two positive-pressure through holes at both ends of the corresponding row of positive-pressure through holes are respectively closer to the short sides of the body than the negative-pressure through holes at both ends of the corresponding row of negative-pressure through holes.

3. The head of the tag device as claimed in claim 1, further comprising:
    a single row of negative-pressure through holes formed through a middle area of the body and arranged along the long-axis direction; and
    two rows of positive-pressure through holes respectively arranged on two sides of the single row of negative-pressure through holes and being respectively close to the long sides of the body.

4. The head of the tag device as claimed in claim 2, further comprising:
    a single row of negative-pressure through holes formed through a middle area of the body and arranged along the long-axis direction; and
    two rows of positive-pressure through holes respectively arranged on two sides of the single row of negative-pressure through holes and being respectively close to the long sides of the body.

5. The head of the tag device as claimed in claim 3, further comprising:
    a plurality of first connectors respectively mounted on the first surface of the body and respectively communicated with the corresponding negative-pressure through holes; and
    a plurality of second connectors respectively mounted on the first surface of the body and respectively communicated with the corresponding positive-pressure through holes.

6. The head of the tag device as claimed in claim 4, further comprising:
    a plurality of first connectors respectively mounted on the first surface of the body and respectively communicated with the corresponding negative-pressure through holes; and
    a plurality of second connectors respectively mounted on the first surface of the body and respectively communicated with the corresponding positive-pressure through holes.

7. The head of the tag device as claimed in claim 3, further comprising:
    at least one negative-pressure air pipe inserted into the corresponding first connector to communicate with the corresponding negative-pressure through hole; and at least one positive-pressure air pipe inserted into the corresponding second connector to communicate with the corresponding positive-pressure through hole.

8. The head of the tag device as claimed in claim 4, further comprising:
- at least one negative-pressure air pipe inserted into the corresponding first connector to communicate with the corresponding negative-pressure through hole; and
- at least one positive-pressure air pipe inserted into the corresponding second connector to communicate with the corresponding positive-pressure through hole.

* * * * *